US007783279B2

(12) United States Patent
Ramanathan et al.

(10) Patent No.: US 7,783,279 B2
(45) Date of Patent: Aug. 24, 2010

(54) HANDLING LOCATION DETERMINATIONS IN A TELECOMMUNICATIONS NETWORK TO REDUCE SUBSCRIBER-EXPERIENCED LATENCY WHILE CONSERVING NETWORK RESOURCES

(75) Inventors: Sriram Ramanathan, Lutz, FL (US); Kaushal A. Thakker, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/678,796

(22) Filed: Feb. 26, 2007

(65) Prior Publication Data

US 2008/0207217 A1    Aug. 28, 2008

(51) Int. Cl.
   *H04M 11/04* (2006.01)
(52) U.S. Cl. .................. 455/404.1; 455/423; 455/456.1
(58) Field of Classification Search .............. 455/456.1, 455/401.1, 423
   See application file for complete search history.

(56) References Cited

U.S. PATENT DOCUMENTS

| | | | | |
|---|---|---|---|---|
| 5,649,289 | A * | 7/1997 | Wang et al. ................. | 340/7.22 |
| 6,078,826 | A * | 6/2000 | Croft et al. .................. | 455/574 |
| 6,275,695 | B1 * | 8/2001 | Obhan ........................ | 455/423 |
| 6,366,780 | B1 * | 4/2002 | Obhan ........................ | 455/453 |
| 6,529,950 | B1 | 3/2003 | Lumelsky et al. | |
| 6,597,772 | B1 * | 7/2003 | Fleming, III ............. | 379/93.25 |
| 7,349,719 | B2 * | 3/2008 | Buniatyan ................... | 455/557 |
| 7,496,071 | B2 * | 2/2009 | Yamada et al. .............. | 370/331 |
| 2005/0014500 | A1 | 1/2005 | Muhonen et al. | |
| 2006/0067338 | A1 | 3/2006 | Hua et al. | |
| 2006/0084431 | A1 | 4/2006 | Hua et al. | |
| 2006/0148477 | A1 | 7/2006 | Reilly | |
| 2008/0207217 | A1 * | 8/2008 | Ramanathan et al. .... | 455/456.1 |
| 2009/0005061 | A1 * | 1/2009 | Ward et al. ............... | 455/456.1 |
| 2010/0069035 | A1 * | 3/2010 | Johnson .................... | 455/404.1 |

FOREIGN PATENT DOCUMENTS

WO    2006061048 A1    6/2006

OTHER PUBLICATIONS

Rhee, J., et al., "Mobile Service Provision System Based on Sensor and SIP Event Notification Mechanism", Communications, 5th Int'l. Sym. On Multi-Dimensional Mobile Communications Proc., vol. 2, No. 29, pp. 740-743, 2004.

Mosmondor, M., et al., "Bringing Location Based Services to IP Multimedia Subsystem", MELECON 2006, Electrotechnical Conf., IEEE, pp. 746-749, May 2006.

* cited by examiner

*Primary Examiner*—William D Cumming
(74) *Attorney, Agent, or Firm*—Patents on Demand, P.A.; Brian K. Buchheit

(57) ABSTRACT

The last known location and last time of location update can be stored for each of a set of mobile devices in device-specific records. A request for a specific mobile device can be received from a location services application. The last time of location update for the specific mobile device can be checked against a current time. If the last update time is current enough, the last known location for the device can be conveyed to the location services application. Information can then be presented on the device that is specific to its last known location.

20 Claims, 3 Drawing Sheets

HANDLING LOCATION DETERMINATIONS IN A TELECOMMUNICATIONS NETWORK TO REDUCE SUBSCRIBER-EXPERIENCED LATENCY WHILE CONSERVING NETWORK RESOURCES

BACKGROUND

1. Field of the Invention

The present invention relates to the field of telecommunications and, more particularly, to handling location determinations to reduce subscriber-experienced latency while conversing network resources.

2. Description of the Related Art

Recent telecommunications advances and a proliferation of mobile telephony subscribers have ushered in an age where subscribers rely upon their mobile telephones as a mobile communication link to a vast array of available services. Subscribers expect to remain in contact with others using the telephone services of their mobile telephones and typically desire their mobile devices to provide them with messaging services, e-mail services, data services. Web browsing services, entertainment services, media streaming services, and the like. These services generally rely upon IP-based networking, which can be provided by an IP multimedia subsystem (IMS) infrastructure.

Providing mobile telephony services is a competitive industry which forces service providers to maximize expensive infrastructure resources in order to provide services to subscriber populations at competitive rates. Further, these services must be maintained at a relatively high level of Quality of Service (QoS), otherwise subscribers will either not utilize revenue-generating services and/or will defect to competing providers who offer better QoS for similar services at similar rates. Generally, service providers are challenged by repurposing existing infrastructure resources from legacy implementations (POTS or PSTN architecture) to more modern ones (IMS-based architecture). Further, service providers are challenged with selectively upgrading equipment and deploying new services in a scalable fashion where QoS is maintained as a subscriber population grows.

Location dependent services are one growth area for subscription services. Such services consume substantial resources and consumer demand is increasing. It is anticipated that location services will become a multi-billion dollar revenue source for providers in the near future. A location-based service is one that at a platform level returns a base set of coordinates, which signify the geographical location of the subscribing device. Different programmatic actions are then taken based upon this geographic location. For example, a weather-based service can be invoked which provides local weather conditions to a subscriber based upon the subscriber's location. Location-based services can require course-grained positioning information (i.e., a general region in which the subscriber device is located) or fine-grained positioning information (i.e., mapping services). Different location-based services can also require updates at different rates, depending upon a service for which the positioning information is being used.

As presently implemented, location dependent services require significant resources to be expended and incur relatively long subscriber-experienced latencies. For example, location is often determined using a Time Difference of Arrival (TDOA) technology that determines an approximate location of a mobile telephone within a service cell. Each time a service needs a mobile telephone position, a TDOA operation is performed and corresponding resources are expended. Further, a typical latency for the network position determining equipment (PDE) has an order of magnitude of over ten seconds and precise location queries can have a latency of up to twenty-five seconds. These latencies are unacceptably long for many services and automatically cause customer dissatisfaction for others.

Further, few service providers can dedicate sufficient infrastructure resources to support reasonable loads and throughputs for location-based service offerings. It should be appreciated that when location-based services are provided, subscribers expect these services to be available regardless of where in a network the subscriber is located. Accordingly, every network location, not just those cells in popular regions that often have more modern network equipment, needs to be capable of providing location-based services at a reasonable QoS. What is needed is a new scalable, resource efficient way to provide location-based services at a reasonable QoS level with lower subscriber-experienced latency.

SUMMARY OF THE INVENTION

The present invention handles location determinations in a telecommunications network in a manner that reduces subscriber-experienced latency while conserving network resources. More specifically, the invention caches subscriber device position information, a last position update time, and utilizes this information for location-based services. The invention further permits network elements to pre-fetch and process location information, whenever sufficient computing resources are available. Consequently, the present invention permits positional information to be immediately available upon request without having to perform post-request position detection operations. Thus, the invention reduces subscriber-experienced latency.

Moreover, the invention increases the scalability of providing location-based services and is more resource efficient than traditional approaches. For example, a position refresh rate and/or position determination level (i.e., different levels pinpointing location to a smaller radius at an expense of additional computing resources and/or processing time) can depend upon network load. Thus, when more resources are available, the solution automatically provides more fine-grained location determinations with an increased refresh rate. Further, subscribers having a premium subscription can be preferred (i.e., receive more precise and/or updated location information) over standard subscribers.

The present invention can be implemented in accordance with numerous aspects consistent with material presented herein. For example, the present solution can include a method for handling requests to determine the locations of mobile devices in a subscriber network. The last known location and last time of location update can be stored for each mobile device. A request for a specific mobile device can be received from a location services application. The last time of location update for the specific mobile device can be checked against a current time. If the last update time is current enough, the last known location for the device can be conveyed to the location services application. Information can then be presented on the device that is specific to its last known location.

Another aspect of the present invention includes a subscriber network that includes an application server, a location determination engine, and a data store. The application server can provide at least one location service to a set of subscriber devices. The location determination engine can return a device location responsive to receiving a location request from the at least one location service. The device location can indicate a location of a subscriber device identified in the location request. The provided location service can include data customized for the returned device location. The data store can store indexed device location records, which are indexed by a unique subscriber device identifier. Each record can include a value for a last known device location and a time of last location update. The location determination engine can utilize a set of programmatic instructions stored in a machine readable memory.

The set of instructions can use defined criteria to ascertain whether the location determination engine is to respond to an incoming location request by dynamically calculating a current location for an associated subscriber device or by looking up a previously determined location for the associated subscriber device from the data store. When the location determination engine dynamically calculates the current location, an indexed record in the data store related to the associated subscriber device can be automatically updated.

Another aspect of the present invention can include a method for providing location based services in a subscriber network. The method can establish sets of subscriber device indexed records that include entries for device location and a last time of location update. These records can be repetitively updated when network resources are available. The method can also receive device location requests from at least one location service that requests a location for one of the subscriber devices. In response to each received device location request, values contained in the indexed records associated with the subscriber device can be looked up. These values can be used to immediately respond to the requests or can indicate that records need to be updated and that a new and more current device location is needed. This method can be used to minimize a number of times that new device locations are needed, while still providing accurate location results.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

These are shown in the drawings, embodiments which are presently preferred, it being understood, however, that the invention is not limited to the precise arrangements and instrumentalities shown.

DETAILED DESCRIPTION OF THE INVENTION

Figure 1:
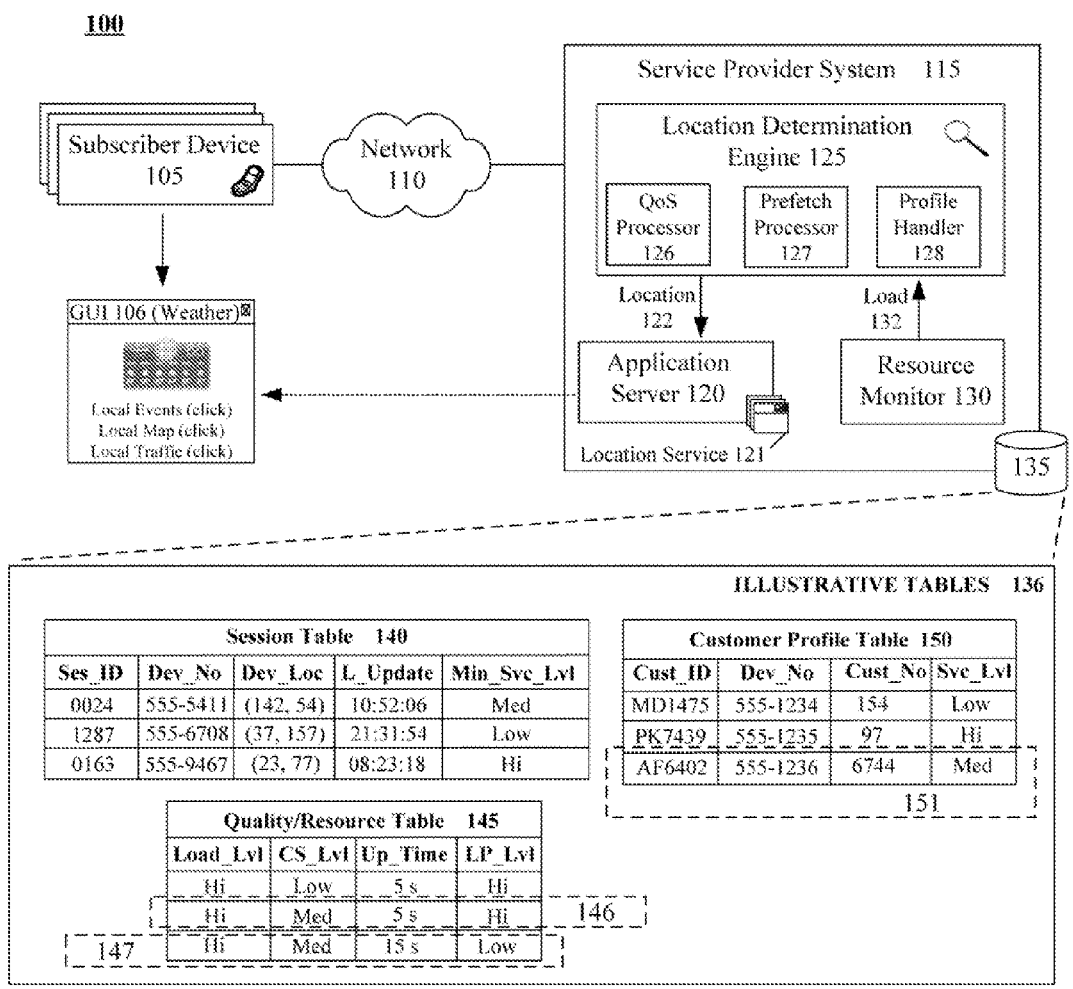
FIG. 1 is a schematic diagram illustrating a system for handling location determinations to reduce subscriber-experienced latency while conserving network resources in accordance with embodiments of the inventive arrangements disclosed herein.

FIG. 1 is a schematic diagram illustrating a system 100 for handling location determinations to reduce subscriber-experienced latency while conserving network resources in accordance with embodiments of the inventive arrangements disclosed herein. In this system 100, the service provider system 115 can adjust the latency experienced by a subscriber device 105 based on resource levels, current load, and customer-specific thresholds.

The subscriber device 105 can be an electronic device able to communicate with the service provider system 115 over a network 110. In one embodiment, the subscriber device 105 can be capable of displaying a graphical user interface (GUI) 106. In another embodiment, the subscriber device 105 (e.g., a pager) can receive and/or send text messages based on a short message service (SMS) or other communication protocol. The subscriber device 105 can include, but is not limited to, a mobile telephone, a personal data assistant (PDA), an embedded in-vehicle computing system, a laptop computer, a wearable computing device, a two-way radio, a media player, a portable entertainment device, a portable navigation device, a pager, a satellite radio system, and the like.

In one embodiment, the subscriber device 105 can include at least one wireless transceiver capable of sending/receiving information to/from network access points, which are communicatively linked to the service provider system 115 via network 110. For example, the transceiver can be a mobile telephony transceiver that sends and receives information to one or more cellular towers. In another example, a wireless transceiver can include a Wireless Local Area Network (WLAN) transceiver (e.g., WiFi, WiMax, and the like) and/or personal area network (PAN) transceiver (e.g., BLUETOOTH, ZIGBE, and the like). A location of the subscriber device 105 can be automatically determined whenever the subscriber device 105 is within range of one or more access points that exchange wireless signals with the device 105 using triangulation principles, assuming that a location of the access points are known.

The service provider system 115 can represent the infrastructure components necessary to provide location-based services 121 in a manner that reduces subscriber-experienced latency while conserving resources. The system 115 can utilize a standardized Next Generation Networking (NGN) architecture, such as an IP Multimedia System (IMS) architecture. Accordingly, the service provider system 115 can support subscriber and service-based QoS while using an underlying IP based network. In one embodiment, system 115 can provide triple play and/or quadruple play services, which include Internet service, television services (e.g., Video on Demand), phone services (e.g., Voice Over IP services), and wireless services. Further, one or more of the location services 121 can be composite services, which can be delivered to an end user across any network or device, regardless of device platform. The service provider system 115 can include a location determination engine 125, an application server 120, a resource monitor 130, and a data store 135.

The resource monitor 130 can be a system component to track the levels of designated system resources that are available for location determinations, such as memory, CPU cycles, and bandwidth. By tracking resources, the resource monitor 130 can determine the overall system load 132 and pass this information to the location determination engine 125.

The location determination engine 125 can be a system component that determines the location 122 of a subscriber device 105. This determination can be based upon triangulation principles and signal characteristics received by access points wirelessly communication with the subscriber device 105. For example, a Time Difference of Arrival (TDOA) technology can be used by the engine 125 to determine an approximate location of a mobile telephone within a service cell. The method of determination used, the accuracy with which determinations are made, and/or the promptness at which the determination is performed can be influenced by the value of the received system load 132 as well as based upon level of service associated with a subscriber or a location service 121 being provided. The location determination engine 125 can include a Quality of Service (QoS) processor 126, a pre-fetch processor 127, and a profile handler 128. Additionally, the location determination engine 125 and its components can access the data contained within the data store 135.

The QoS processor 126 can execute algorithms to resolve and/or adjust the level of quality in which a location determination is performed for a subscriber device 105. Based on the data records in the data store 135, the QoS processor 126 can elevate or demote how and/or when a specific location determination is performed. Factors influencing the ranking of location determinations can include a customer's subscriber level, the precision required for the requesting application or service, current system load, available resources, and the like.

The pre-fetch processor 127 can determine if the location of the requested subscriber device 105 is already stored in the data store 135. When an entry for the location of the subscriber device 105 exists in-memory, the pre-fetch processor 127 can check the time at which the location was last updated. If the last update time is within a predetermined threshold, the pre-fetch processor 127 can retrieve the stored device location data. Otherwise, the pre-fetch processor 127 can cause a new location determination operation to be performed, which results in updated data store 135 values. Data store 135 updates performed by the pre-fetch processor 127 can occur responsive to receiving a location request or can occur asynchronous to a location request. That is, when system resources permit, the pre-fetch processor 127 can selectively update location data for subscriber devices 105 to assure information currency in the data store 135.

The profiler handler 128 can access the data store 135 to gather customer and/or system profile data. Profile data can be used by the QoS processor 126 when determining how to rank a location determination request. The profile handler 128 can retrieve profile data based upon the received system load 132, a specific customer, a specific device, and the like.

When the location determination engine 125 completes its activities, a location 122 for the subscriber device 105 can be conveyed to the application server 120. The application server 120 can execute one or more location service 121. The location service 121 can use the received location 122 to customize the data sent back to the subscriber device 105 to the specific location of the device 105. For example, the determination that a device 105 is located in Orlando, Fla. can allow the location service 121 to customize the options presented in a GUI 106 to this specific area, such as weather and map listings that are local to the Orlando area.

As used herein, data store 135 can be a physical or virtual storage space configured to store digital information. Data store 135 can be physically implemented within any type of hardware including, but not limited to, a magnetic disk, an optical disk, a semiconductor memory, a digitally encoded plastic memory, a holographic memory, or any other recording medium. The data store 135 can be a stand-alone storage unit as well as a storage unit formed from a plurality of physical devices. Additionally, information can be stored within data store 135 in a variety of manners. For example, information can be stored within a database structure or can be stored within one or more files of a file storage system, where each file may or may not be indexed for information searching purposes. Further, data store 135 can utilize one or more encryption mechanisms to protect stored information from unauthorized access.

Network 110 can include any hardware/software/and firmware necessary to convey data encoded within carrier waves. Data can be contained within analog or digital signals and conveyed though data or voice channels. Network 110 can include local components and data pathways necessary for communications to be exchanged among computing device components and between integrated device components and peripheral devices. Network 110 can also include network equipment, such as routers, data lines, hubs, and intermediary servers which together form a data network, such as the Internet. Network 110 can also include circuit-based communication components and mobile communication components, such as telephony switches, modems, cellular communication towers, and the like. Network 110 can include line based and/or wireless communication pathways.

Interaction among the components of system 100 can be clarified through an example as follows. It should be appreciated that the following example, using the data contained within the illustrative tables 136, is for illustrative purposes only and that the invention should not be construed as limited to the specific arrangements used within. In the example, the resource monitor 130 can determine that the service provider system 115 is operating at a high load level, which can default the general quality of service for location determinations to low. That is, few resources of system 115 can be available for location services 121, therefore a resource conservative mode (which results in a drop in QoS) is activated, which prevents a general degradation of performance across the system 115. In the present example, the location service 121 provided to device 105 can be that of a weather application, which makes a request to the location determination engine 125 for the location 122 of a device number of 555-1236.

The pre-fetch processor 127 can then query the session table 140 for a session for a device 105 with this number. No record exists in the table 140 for this device, therefore the pre-fetch processor 127 determines that the location must be determined and cannot simply be retrieved from this table 140. The profile handler 128 queries the customer profile table 150 and the quality/resource table 145 for applicable records. The query returns rows 146 and 147 from the table 145, which correspond to the high load, and row 151 from table 150, which corresponds to the specific device number.

The QoS processor 126 uses the data retrieved by the profile handler 128 to determine that the device/request should receive a medium quality of service.

Rows 146 and 147 both pertain to high load and a customer service level of medium with the difference in update time based on the requested level of precision. The QoS processor 126 checks the location request to find that the level of precision for the weather service 121 is low; this service 121 only requires a general area location, such as city or county. Different types of services 121 will require various levels of accuracy/precision. For example, a location request from a real-time navigation application would require a much higher level of accuracy in order to provide specific street-level information. Further, a relatively rapid location update time can be required for a real-time navigation service 121. A minimum location update time and required location accuracy, both of which are factors of QoS for location based services 121, can vary from service-to-service.

In the weather example, the QoS processor 126 can determine that the location request from the weather service 121 should be marked as medium, instead of the default status of low, under the current system conditions. This status determination will place this location determination ahead of existing low status requests and behind requests with a status of high. Further, among all the requests marked with a medium status, this particular request will be grouped at the lower end due to its low accuracy/precision level. That is, other requests of medium status that have a higher location accuracy and a more immediate update time will be processed before this specific request. Once the location 122 is determined, the location service 121 can retrieve appropriate weather information for that location, which is conveyed to device 105 and presented in GUI 106. A subsequent subscriber request, such has a request for local traffic information that can rely upon a different location service 121, can follow, which can be quickly satisfied using the already determined location of device 105, which is stored in table 135 along with the last update time.

Figure 2:
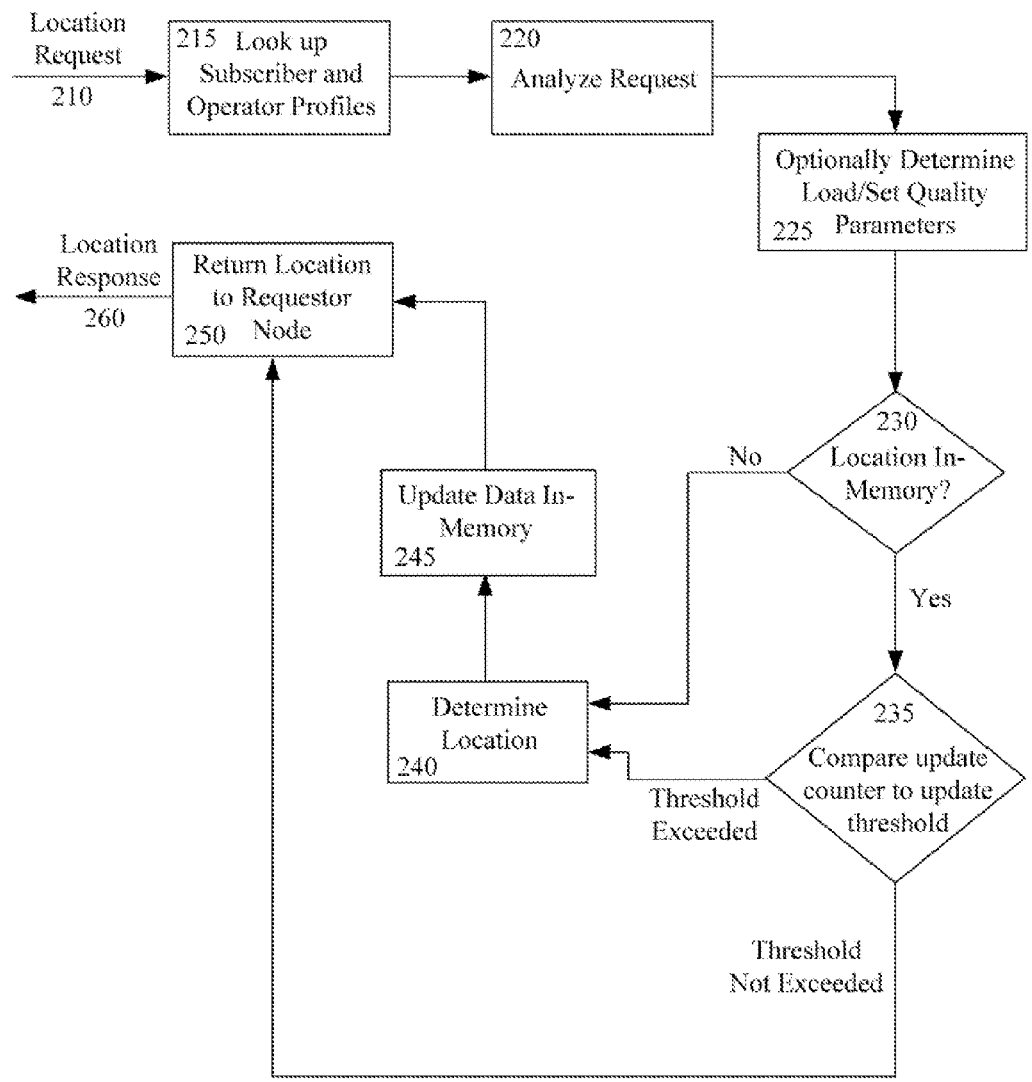
FIG. 2 is a flow chart of a method that handles location determinations to reduce subscriber-experienced latency while conserving network resources in accordance with an embodiment of the inventive arrangements disclosed herein.

FIG. 2 is a flow chart of a method 200 that handles location determinations to reduce subscriber-experienced latency while conserving network resources in accordance with an embodiment of the inventive arrangements disclosed herein. Method 200 can be performed in the context of system 100 or any IMS based communication system.

The flow chart 200 can begin with the receipt of a location request 210. Upon receipt of this request 210, the system can look up the subscriber and operator profiles in step 215. Step 215 can be performed by the profile handler 128 of system 100. Additionally, the data for these profiles can be stored within a data store, such as data store 135 of system 100, and can designate service levels for various conditions.

In step 220, the system can analyze the request 210. The system can optionally determine the load and/or set quality parameters in step 225. In step 230, the system can determine if the location is already contained within memory. When the location is not available in-memory, flow can proceed to step 240.

When the location is available in-memory, step 235 can execute where an update counter can be compared to the update threshold. When the threshold is not exceeded, flow can proceed to step 250. When the threshold is exceeded, step 240 can execute where the location can be determined.

The location determination of a device can be achieved in a variety of techniques, such as Global Positioning System (GPS), Received Signal Strengths (RSS), and Remote Authentication Dial-In User Service (RADIUS). It should be noted that the selection of a determination technique can be influenced by many factors, such as the type of device and type of network connection. For example, GPS can only be used with a GPS-enabled device and RADIUS requires a RADIUS server on a Wireless Local Area Network (WLAN).

The RSS technique uses triangulation to determine a device's location. Triangulation calculations can be based on lateration, measuring distance, or angulation, measuring angles. For lateration, measurements can be determined by taking a physical measurement (direct), calculating the time difference between the signal's transmission and its receipt by the device and multiplying it by the signal velocity (time of flight), and calculating the square root of the inverse of the signal strength (attenuation). Angulation measures the angles of a device from two known points.

It should be appreciated that step 240 can include multiple determination techniques and/or methods and the capability to switch between methods based on encountered conditions. For example, the system can be set to switch from an attenuation triangulation method to a time of flight method for a mobile phone that is not GPS-enabled when the received signal strength is below a predetermined threshold.

The location determined in step 240 can be updated/stored in-memory in step 245. In step 250, the determined location can be returned to the requestor node, generating a location response 260.

Figure 3:
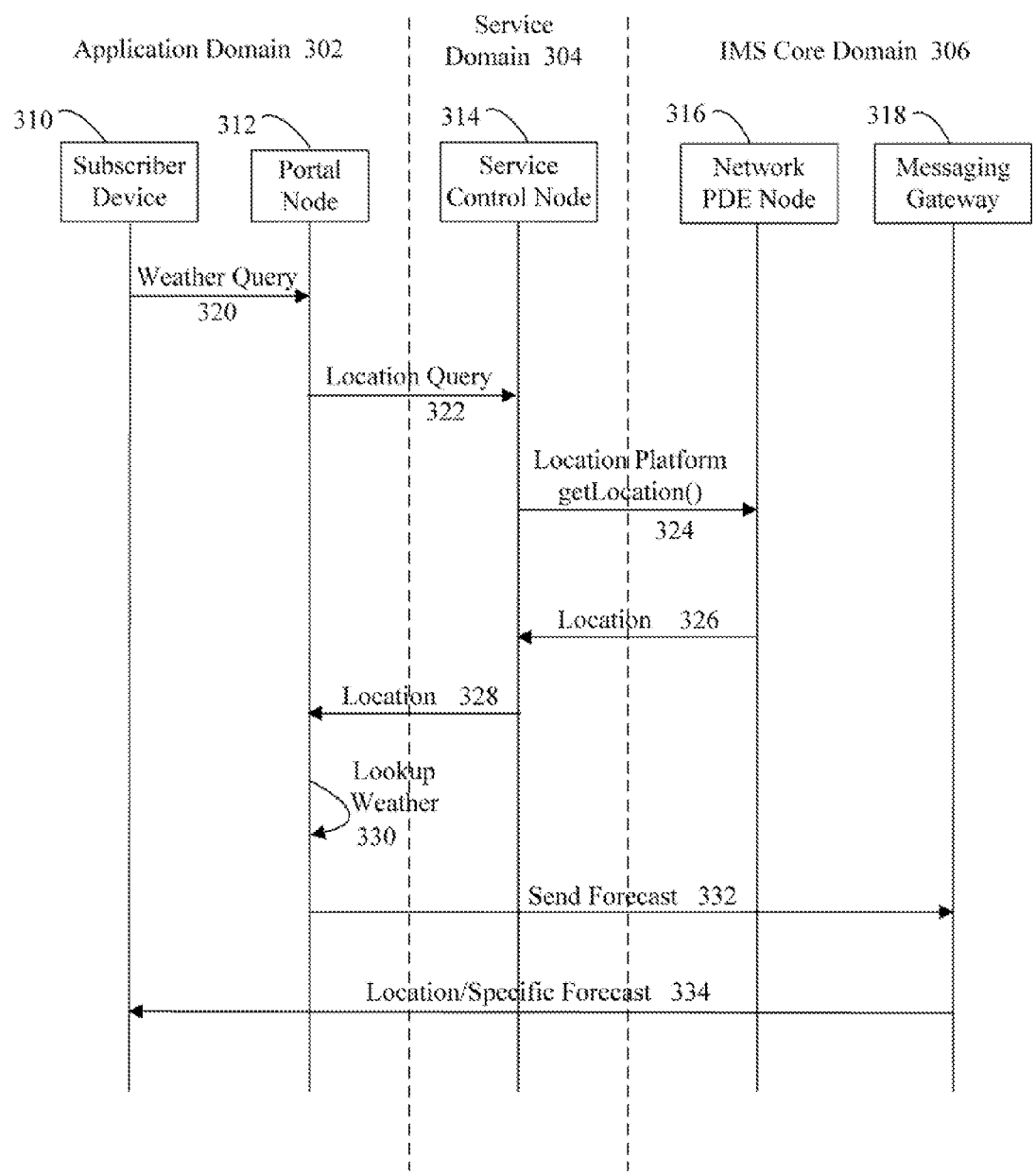
FIG. 3 is a flow diagram depicting example components and interactions required for handling location determinations to reduce subscriber-experienced latency while conserving network resources in accordance with an embodiment of the inventive arrangements disclosed herein.

FIG. 3 is a flow diagram 300 depicting example components and interactions required for handling location determinations to reduce subscriber-experienced latency while conserving network resources in accordance with an embodiment of the inventive arrangements disclosed herein. In this example, a weather service is used to illustrate how location influences component interactions.

These interactions can occur between the application domain 302, the service domain 304, and an IP multimedia subsystem (IMS) core domain 306. The application domain 302 can include a subscriber device 310 and a portal node 312. The service domain 304 can include a service control node 314. The IMS core domain 306 can include a network position determining equipment (PDE) node 316 and a messaging gateway 318.

Interactions between these components can begin with the subscriber device 310 issuing a weather query 320 to the portal node 312. The weather query 320 can trigger the portal node 312 to send the service control node 314 a location query 322 for the subscriber device 310.

In response to the location query 322, the service control node 314 can transmit a getLocation( ) command 324 to the network PDE node 316. Once the getLocation( ) command 324 is processed, the network PDE node 316 can relay the calculated location 326 back to the service control node 314 which can then relay the calculated location 328 back to the portal node 312. The calculated location 328 can be looked up from a table containing previously stored locations and/or can be dynamically determined.

The portal node 312 can then attempt to lookup weather 330 based on the received location 328. Once complete, the portal node 312 can send the forecast 332 to the messaging gateway 318. The messaging gateway 318 can then send the subscriber device 310 a location/specific forecast 334 that is based upon location 328.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that is carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for handling location determination operations for a subscriber network comprising:

storing, via computing equipment controlled by a program, mobile device specific records specifying a last known location of each of a plurality of mobile devices and a last time of location update for each mobile device, wherein said records are stored in a storage space comprising physical hardware;

receiving, via computing equipment controlled by a program, a location request for a designated one of the mobile devices from a location services application;

comparing, via computing equipment controlled by a program, the last time of location update associated with the designated device against a current time; and when the comparing step indicates the last update time is sufficient for purposes of handling the location request, conveying, via computing equipment controlled by a program, the stored last known location for the designated device to the location services application, wherein the location services application causes a presentation of information upon the designated device that is specific to the conveyed last known location.

2. The method of claim 1, further comprising:

when the comparing step indicates that the last update time is insufficient for purposes of handling the location request, updating, via computing equipment controlled by a program, the last known location of the designated device and the last time of location updated in an associated stored record; and conveying, via computing equipment controlled by a program, the stored last known location for the designated device to the location services application, wherein the location services application causes a presentation of information upon the designated device that is specific to the conveyed last known location.

3. The method of claim 1, further comprising:

intermittently updating, via computing equipment controlled by a program, the specific records that includes updating the last known location and the last time of location update for the plurality of mobile devices, wherein the updating step occurs asynchronously to the receiving step.

4. The method of claim 3, wherein the plurality of mobile devices to which the updating step applies includes a set of mobile devices actively participating in real-time communication sessions.

5. The method of claim 3, wherein the plurality of mobile devices to which the updating step applies includes a set of mobile devices for which a registered subscription for at least one location service exists.

6. The method of claim 1, wherein the different ones of the plurality of mobile devices are associated with different categories of service, wherein the different categories of service are associated with different minimum update times for handling location requests.

7. The method of claim 1, further comprising:

in a pre-fetch operation, repetitively updating, via computing equipment controlled by a program, the last update time and the last known location for the designated device before receiving the location request.

8. The method of claim 7, wherein a frequency of the repetitively updating step is dependent upon a level of available computing resources.

9. The method of claim 7, wherein different ones of the plurality of mobile devices are associated with different categories of service, wherein a frequency of the repetitively updating step is dependent upon a category of service associated with the designated device.

10. The method of claim 1, wherein the location services application provides a composite service.

11. The method of claim 1, wherein the subscriber network is an IP Media Subsystem (IMS) network.

12. The method of claim 1, wherein said steps of claim 1 are performed by at least one machine in accordance with at least one computer program having a plurality of code sections that are executable by the at least one machine.

13. The method of claim 1, wherein the steps of claim 1 are performed by at least one of a service agent and a computing device manipulated by the service agents, the steps being performed in response to a service request.

14. A subscriber network comprising hardware comprising:

an application server, comprising at least a program for controlling computing equipment that is stored in a storage space comprising physical hardware, providing at least one location service to a plurality of subscriber devices;

a location determination engine, comprising at least a program for controlling computing equipment that is stored in a storage space comprising physical hardware, configured to return a device location responsive to receiving a location request from the at least one location service, wherein the device location indicates a location of a subscriber device identified in the location request, wherein the provided location service includes data customized for the returned device location;

a data store, which is a storage space comprising physical hardware, configured to a plurality of indexed device location records, said device location records being indexed by a unique subscriber device identifier and each including a value for a last known device location and a time of last location update; and a set of programmatic instructions stored in a machine readable memory comprising physical hardware utilized by the location determination engine which utilizes a plurality of defined criteria to ascertain whether the location determination engine is to respond to an incoming location request by dynamically calculating a current location for an associated subscriber device or by looking up a previously determined location for the associated subscriber device from the data store, wherein when the location determination engine dynamically calculates the current location, an indexed record in the data store related to the associated subscriber device is automatically updated so that the last known device location equals the calculated current location and the time of last location update is set to a current time.

15. The subscriber network of claim 14, wherein the set of programmatic instructions grants different subscriber devices preferential treatment compared to other subscriber devices based upon a recorded subscriber service level of the associated subscriber device.

16. The subscriber network of claim 14, wherein the location determination engine repetitively and proactively updates at least a portion of the indexed device location records.

17. The subscriber network of claim 14, wherein the subscriber network is an IP Media Subsystem (IMS) network.

18. The subscriber network of claim 16, wherein the at least one location services application is a composite services application.

19. A method for providing location based services in a subscriber network comprising:

- establishing, via computing equipment controlled by a program, a set of subscriber device indexed records that include entries for device location and a last time of location update, wherein said subscriber device indexed records are stored in a storage space comprising physical hardware;
- repetitively updating, via computing equipment controlled by a program, the indexed records;
- receiving, via computing equipment controlled by a program, device location requests from at least one location service that requests a location for one of a subscriber device, wherein the updating step occurs independent of the receiving step;
- in response to each received device location request, looking-up, via computing equipment controlled by a program, values contained in the indexed records associated with the subscriber device;
- depending upon looked-up value results and based upon previously defined criteria, determining, via computing equipment controlled by a program, whether it is necessary to dynamically determine a current location of the subscriber device, wherein the previously defined criteria includes a subscriber service level of the subscriber device, which is able to change results of the determining step;
- when the determining step indicates it is not necessary to dynamically determine the current location, responding, via computing equipment controlled by a program, to the device location request by returning the device location stored in the indexed record associated with the subscriber device; and
- when the determining step indicates it is necessary to dynamically determine the current location, automatically ascertaining, via computing equipment controlled by a program, a current location of the subscriber device and updating the indexed record associated with the subscriber device in accordance with the ascertained location.

20. The method of claim 19, wherein the ascertaining step utilizes a Time Difference of Arrival (TDOA) based algorithm to dynamically determine the current location of the subscriber device.

* * * * *